(12) United States Patent
Kumazaki et al.

(10) Patent No.: US 11,644,399 B2
(45) Date of Patent: May 9, 2023

(54) THERMAL ANALYSIS APPARATUS

(71) Applicant: HITACHI HIGH-TECH SCIENCE CORPORATION, Tokyo (JP)

(72) Inventors: Takashi Kumazaki, Tokyo (JP); Kentaro Yamada, Tokyo (JP)

(73) Assignee: HITACHI HIGH-TECH SCIENCE CORPORATION, Tokyo (JP)

(*) Notice: Subject to any disclaimer, the term of this patent is extended or adjusted under 35 U.S.C. 154(b) by 441 days.

(21) Appl. No.: 16/812,056

(22) Filed: Mar. 6, 2020

(65) Prior Publication Data

US 2020/0292431 A1 Sep. 17, 2020

(30) Foreign Application Priority Data

Mar. 11, 2019 (JP) .............................. JP2019-043654

(51) Int. Cl.
*G01N 5/00* (2006.01)
(52) U.S. Cl.
CPC ...................................... *G01N 5/00* (2013.01)
(58) Field of Classification Search
CPC ............. G01N 5/00; G01N 5/04; G01N 5/045
USPC ........... 73/73, 865, 866; 374/14, 45; 177/50, 177/150, 154, 157, 180, 190, 191, 194, 177/210 EM
See application file for complete search history.

(56) References Cited

FOREIGN PATENT DOCUMENTS

| CN | 103123315 | * | 9/2016 |
| GB | 2535504 | * | 8/2016 |
| JP | 10-104147 A | | 4/1998 |
| JP | H11337738 | * | 10/1999 |

* cited by examiner

*Primary Examiner* — Robert R Raevis
(74) *Attorney, Agent, or Firm* — Holland & Hart LLP

(57) ABSTRACT

A thermal analysis apparatus includes: a cylindrical heating furnace extending in an axial direction; a weight detector arranged on a rear-end side in the axial direction of the cylindrical heating furnace and including levers extending in the axial direction to detect a weight; a connecting portion for connecting the cylindrical heating furnace and the weight detector to communicate an internal space of the cylindrical heating furnace with an internal space of the weight detector and positioning the levers from the weight detector into the cylindrical heating furnace; sample holding portions connected to tip ends of the levers and arranged inside the cylindrical heating furnace and holding a sample; resistance heaters arranged to cover the weight detector and energized by an electric current of 6 A or less; and a heater control part for controlling an energization state of the resistance heaters to maintain the weight detector at a constant temperature.

10 Claims, 7 Drawing Sheets

THERMAL ANALYSIS APPARATUS

CROSS REFERENCE TO RELATED APPLICATION(S)

This application claims the benefit of Japanese Patent Application No. 2019-043654, filed Mar. 11, 2019, which is hereby incorporated by reference in its entirety into this application.

BACKGROUND OF THE INVENTION

1. Field of the Invention

The present invention relates to a thermal analysis apparatus for measuring a physical change of a sample along with its temperature change caused by heating the sample.

2. Description of the Related Art

Hitherto, as a technique of evaluating temperature characteristics of a sample, there has been employed a technique called thermal analysis for measuring a physical change of a sample along with its temperature change caused by heating the sample. The thermal analysis includes all such techniques defined in JIS K 0129: 2005 "General rules for thermal analysis," for measuring physical properties of a measurement target (sample) obtained when the temperature of the sample is controlled based on a program. One example of the thermal analysis is thermogravimetry (TG) for detecting a mass (weight change).

In a thermal analysis apparatus configured to perform the thermogravimetry (TG), a sample is placed on a tip end of a horizontal lever configured to detect a weight, the tip end of the lever is inserted into a heating furnace (generally into an internal space of a core tube in the heating furnace), and an inclination of the lever is detected by a weight detector to detect a weight change of the sample.

However, there is a problem in that detection accuracy is reduced when the weight detector is affected by heat from the heating furnace. Therefore, there has been developed a technology of maintaining the weight detector at a constant temperature by a heater (Japanese Patent Application Laid-open No. Hei 10-104147).

SUMMARY OF THE INVENTION

Incidentally, the weight detector is configured to allow an electric current to flow through a coil attached to the lever to generate an electromagnet, perform control to maintain the lever horizontal by an action between the coil and magnets attached above and below the coil, and measure a coil current to detect the weight of the sample.

However, it has been found that, when an energization current is allowed to flow through a resistance heater configured to adjust a temperature of the weight detector, a magnetic field is generated and affects as noise the detection by the weight detector.

The present invention has been made to solve the above-mentioned problem, and therefore has an object to provide a thermal analysis apparatus with which a reduction in detection accuracy of a weight detector is suppressed.

In order to achieve the above-mentioned object, according to at least one embodiment of the present invention, there is provided a thermal analysis apparatus including: a cylindrical heating furnace extending in an axial direction; a weight detector, which is arranged on a rear end side in the axial direction of the cylindrical heating furnace, and includes a lever extending in the axial direction to detect a weight; a connecting portion configured to connect the cylindrical heating furnace and the weight detector to communicate an internal space of the cylindrical heating furnace and an internal space of the weight detector, and to arrange the lever from the weight detector into the cylindrical heating furnace; a sample holding portion, which is connected to a tip end of the lever and arranged inside the cylindrical heating furnace, and is configured to hold a sample; a resistance heater, which is arranged to cover the weight detector, and is to be energized by an electric current of 6 A or less; and a heater control part configured to control an energization state of the resistance heater to maintain the weight detector at a constant temperature.

According to the thermal analysis apparatus, with the heater being energized to be heated (above an ambient temperature) to the constant temperature, the weight detector can be maintained at the constant temperature, and measurement accuracy can be increased.

Further, with the heater being set so that the energization current is 6 A or less, the heater can be heated with a relatively low current, and a magnetic field caused by the electric current flowing through a circuit of the heater is reduced. As a result, the magnetic field can be prevented from becoming noise when the lever is controlled to be horizontal (electric current flowing through the coil is measured), and the measurement accuracy can be further increased.

In the thermal analysis apparatus of the present invention, the heater control part may be configured to maintain the weight detector at 50° C. or less.

This is because, when a heating maintaining temperature of the weight detector by the heater is 50° C. or less, gravimetry near a room temperature can also be performed.

In the thermal analysis apparatus of the present invention, the lever may have a TG signal noise width, which indicates a background fluctuation width of a TG curve measured with the thermal analysis apparatus, of 0.2 µg or less.

Generally, the lever is formed with the use of a non-magnetic material (for example, stainless steel), but an actual lever may have small magnetism due to a change in crystal structure caused by an effect of cutting and other such processing, and other such reasons. To address this problem, when the lever is ensured to have a specific TG signal noise width of 0.2 µg or less, noise caused by the lever itself can be suppressed, and the measurement accuracy of the weight detector can be further increased.

The thermal analysis apparatus of the present invention may further include: a heating furnace cover, which is configured to cover at least the cylindrical heating furnace in the axial direction and has an air intake port on the rear end side of the cylindrical heating furnace, the heating furnace cove including a fan which is arranged in front of the air intake port, and is c configured to generate an airflow inside the heating furnace cover to travel from a rear end to a tip end in the axial direction.

With this configuration, heat of the heating furnace can be prevented from being conducted to the weight detector side, and the weight detector can be maintained at the constant temperature more reliably to increase the measurement accuracy. Further, the weight detector can be maintained at a lower temperature, and hence it becomes easier to maintain the weight detector at 50° C. or less.

The thermal analysis of the present invention may further include a weight detector cover, which is configured to cover at least the weight detector in the axial direction and close an external space on a tip end side of the weight detector, and has an opening into and from which air enters and exits on the rear end side of the weight detector.

With this configuration, heat of the heating furnace can be prevented from being conducted to the weight detector side, and outside air can be allowed to enter and exit into and from surroundings of the weight detector through the opening. As a result, a difference between the heating temperature of the heater and the ambient temperature of the weight detector can be increased, and the weight detector can be maintained at the constant temperature more reliably by the heater. Further, the weight detector can be maintained at a lower temperature, and hence it becomes easier to maintain the weight detector at 50° C. or less.

The thermal analysis apparatus of the present invention may have a gap between the heating furnace cover and the weight detector cover in the axial direction, and at least a part of the connecting portion may be exposed in the gap.

With this configuration, at least a part of the connecting portion is exposed, with the result that it becomes easier to cool the connecting portion, and the heat of the heating furnace can be prevented from being conducted to the weight detector side via the connecting portion. As a result, the weight detector can be maintained at the constant temperature more reliably to increase the measurement accuracy. Further, the weight detector can be maintained at a lower temperature, and hence it becomes easier to maintain the weight detector at 50° C. or less.

In the thermal analysis apparatus of the present invention, a second fan may be arranged in a particular position, which is configured to generate an airflow from the gap to the connecting portion.

With this configuration, the connecting portion can be further cooled.

In the thermal analysis apparatus of the present invention, the cylindrical heating furnace may include: a furnace tube, which is made of a transparent material and is formed into a cylindrical shape, and in which the sample holding portion is arranged; a cylindrical core tube, which forms an inner surface of the cylindrical heating furnace, and into which the furnace tube is inserted; a heating furnace heater fitted onto the cylindrical core tube; and a cylindrical outer cylinder, which has side walls on both ends thereof, and surrounds the heating furnace heater, and the cylindrical core tube and the cylindrical outer cylinder may have first opening portions, which are formed as through holes that connect to each other so that the sample is observable from outside the cylindrical outer cylinder through the furnace tube.

With this configuration, a change of the sample under thermal analysis can be observed from the first opening portion through the furnace tube.

In the thermal analysis apparatus of the present invention, the heating furnace cover may have a second opening portion, which overlaps the first opening portion in a penetration direction.

With this configuration, even under a state of being covered with the heating furnace cover, the change of the sample under the thermal analysis can be observed from the second opening portion and the first opening portion through the furnace tube.

According to the present invention, the thermal analysis apparatus with which the reduction in detection accuracy of the weight detector is suppressed can be obtained.

DESCRIPTION OF THE EMBODIMENTS

In the following, an embodiment of the present invention is described with reference to the accompanying drawings. Note that, a side close to a heating furnace 3 and a tip end portion 9a of a furnace tube 9 along an axial direction O is referred to as "tip end (side)," and the opposite side is referred to as "rear end (side)."

Figure 1:
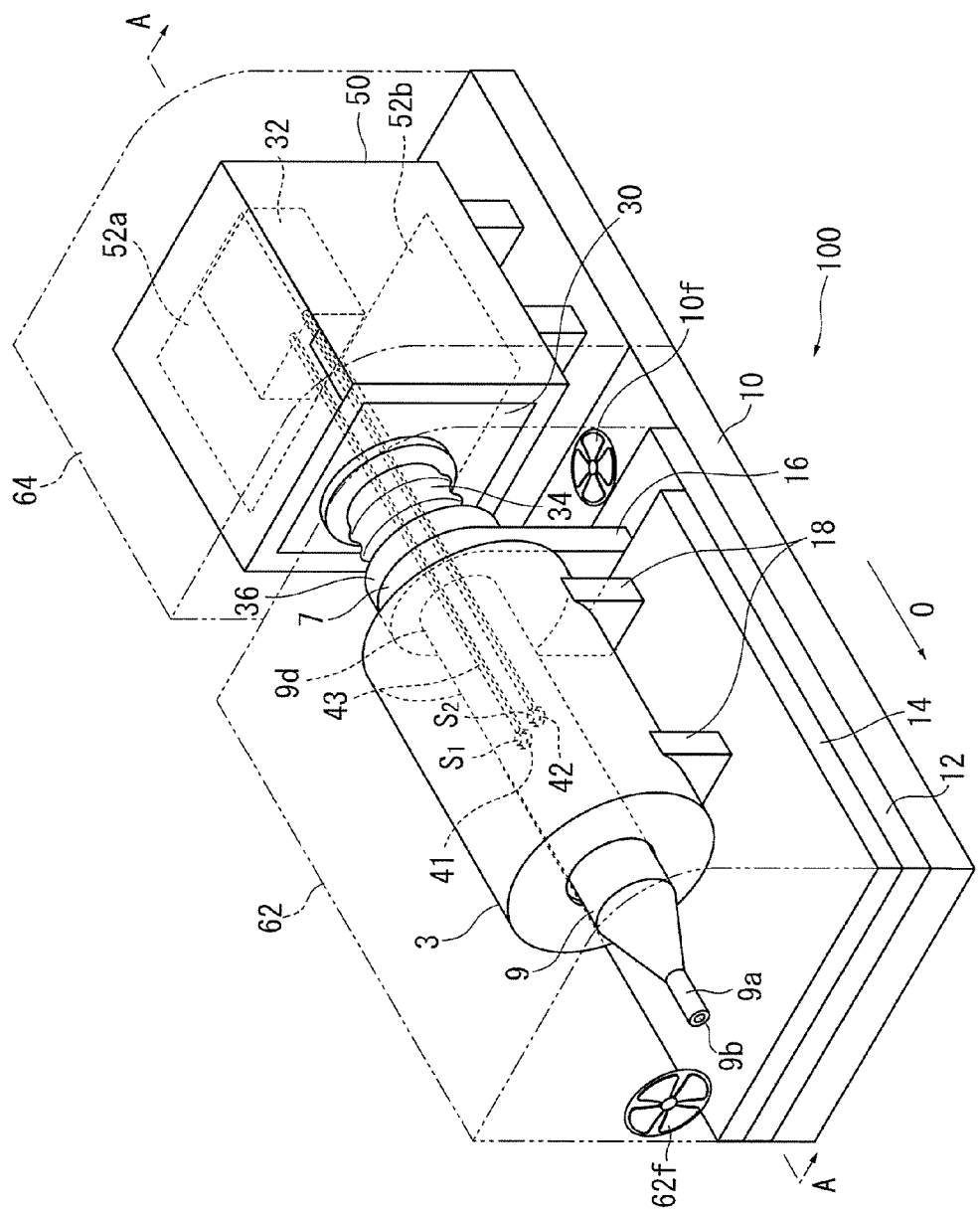
FIG. 1 is a perspective view for illustrating the structure of a thermal analysis apparatus according to an embodiment of the present invention.
Figure 2:
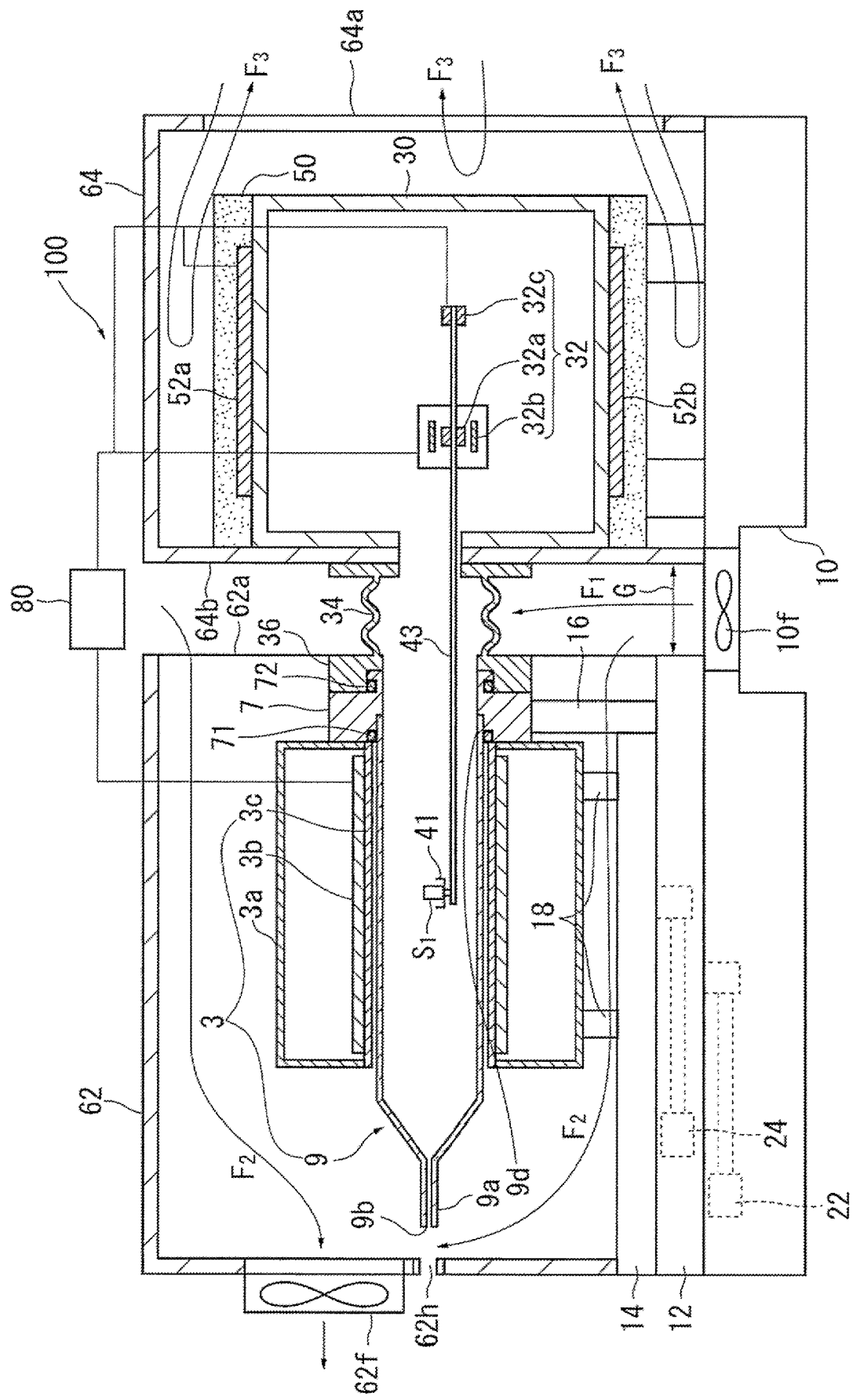
FIG. 2 is a sectional view taken along the line A-A of FIG. 1.

FIG. 1 is a perspective view for illustrating the structure of a thermal analysis apparatus 100 according to the embodiment of the present invention. FIG. 2 is a sectional view taken along the line A-A of FIG. 1.

The thermal analysis apparatus 100 serves as a thermogravimetry (TG) apparatus, and includes the cylindrical furnace tube 9, a cylindrical heating furnace 3 which externally surrounds the furnace tube 9, sample holders (corresponding to "sample holding portion" in the claims 41 and 42 which are arranged inside the furnace tube 9 and hold samples $S_1$ and $S_2$, respectively, a first support base 12, a second support base 14 placed on a top surface of the first support base 12, a measurement chamber 30 which is connected to a rear end portion 9d of the furnace tube 9 in the axial direction O, a weight detector 32 which is arranged inside the measurement chamber 30 and measures weight changes of the samples $S_1$ and $S_2$, and a base 10 having a top surface on which the first support base 12 and the measurement chamber 30 are placed.

Top and bottom surfaces of the measurement chamber 30 are covered by a heat insulating member 50, and AC resistance heaters 52a and 52b are embedded in top and bottom surfaces of the heat insulating member 50, respectively, so as to sandwich the weight detector 32.

Further, a heating furnace cover 62 configured to cover the heating furnace 3, and a weight detector cover 64 configured to cover the weight detector are provided.

Further, a lower end in the vicinity of both axial ends of the heating furnace 3 is connected to a top surface of the second support base 14 by two support columns 18. Further, a flange part 7 is fixed on the outer side of the rear end portion 9d of the furnace tube 9, and a lower end of the flange part 7 is connected to a top surface of the first support base 12 by a support column 16. The support column 16 is arranged on a rear end side with respect to a rear end of the second support base 14, and does not interfere with the second support base 14.

As illustrated in FIG. 2, the first support base 12 is reciprocable in the axial direction O with respect to the base 10 by, for example, a linear actuator 22 embedded in the base 10.

The second support base 14 is reciprocable in the axial direction O with respect to the first support base 12 by, for example, a linear actuator 24 embedded in the first support base 12.

The heating furnace 3 includes a cylindrical core tube 3c forming an inner surface of the heating furnace 3, a heating furnace heater 3b fitted onto the core tube 3c, and a cylindrical outer cylinder 3a having side walls on both ends thereof (see FIG. 2). At the center of each side wall of the outer cylinder 3a, a center hole is formed so as to insert the core tube 3c therethrough. The outer cylinder 3a surrounds the heating furnace heater 3b to maintain the temperature of the heating furnace 3, and the outer cylinder 3a may have an adjustment hole (not shown) as appropriate to adjust the temperature of the heating furnace 3. The inner diameter of the core tube 3c is larger than the outer diameter of the furnace tube 9, and the heating furnace 3 is configured to heat the furnace tube 9 (and the samples $S_1$ and $S_2$ inside the furnace tube 9) in a non-contact manner.

The outer cylinder 3a may have an adjustment hole (not shown) as appropriate to adjust the temperature of the heating furnace 3.

The furnace tube 9 is reduced in diameter to have a tapered shape toward the tip end portion 9a. The tip end portion 9a is formed into an elongated capillary shape, and has a gas discharge port 9b opened at its tip end. A purge gas is introduced into the furnace tube 9 from the rear end side as appropriate, and the purge gas, decomposition products generated from the samples due to heating, and the like are discharged to the outside through the gas discharge port 9b. On the other hand, on the outer side of the rear end portion 9d of the furnace tube 9, the ring-like flange part 7 is fixed through an intermediation of a seal member 71 (see FIG. 2).

Further, the furnace tube 9 is made of a transparent material, and hence the samples $S_1$ and $S_2$ are observable from outside the furnace tube 9. The transparent material herein refers to a material which allows visible light to pass therethrough at a predetermined light transmittance, and includes a semi-transparent material. Further, as the transparent material, quartz glass or sapphire glass may be used suitably.

It should be noted, however, that the furnace tube 9 may be formed of a non-transparent material, for example, ceramics.

Balance arms (corresponding to "lever" in the claims 43 and 44 extending horizontally in the axial direction O toward the rear end side are connected to the sample holders 41 and 42, respectively, and the balance arms 43 and 44 are arranged in a horizontal direction. The samples $S_1$ and $S_2$ are placed on the sample holders 41 and 42 through an intermediation of sample containers (not shown), respectively. In this case, the sample $S_1$ is a measurement sample (sample) and the sample $S_2$ is a reference substance (reference). Further, thermocouples are arranged immediately below the sample holders 41 and 42, and hence the temperatures of the samples can be measured. The balance arms 43 and 44, the sample holders 41 and 42, and the sample containers (not shown) are each made of, for example, platinum.

The measurement chamber 30 is arranged at the rear end of the furnace tube 9, and a tube-like bellows (corresponding to "connecting portion" in the claims) 34 extending in the axial direction O toward the tip end side of the furnace tube 9 is fixed to the tip end portion of the measurement chamber 30 through an intermediation of a seal member (not shown). The tip end side of the bellows 34 forms a flange part 36, and the flange part 36 is hermetically connected to the flange part 7 through an intermediation of a seal member 72. In this manner, the measurement chamber 30 and the furnace tube 9 communicate internally to each other, and the rear ends of the balance arms 43 and 44 extend to the interior of the measurement chamber 30 through the furnace tube 9. Note that, as the seal members, for example, an O-ring or a gasket may be used.

As illustrated in FIG. 2, the weight detector 32 arranged inside the measurement chamber 30 includes coils 32a, magnets 32b, and position detecting parts 32c. The position detecting parts 32c are each formed of, for example, a photosensor, and are arranged on the rear end side of the balance arms 43 and 44 to detect whether or not the balance arms 43 and 44 are held in a horizontal state. On the other hand, the coils 32a are fixed to axial centers (fulcrums) of the balance arms 43 and 44, and the magnets 32b are arranged on both upper and lower sides of each coil 32a. A current is caused to flow through the coils 32a so that the balance arms 43 and 44 assume a horizontal state, and the current is measured, to thereby measure the weights of the respective samples $S_1$ and $S_2$ at the tip ends of the balance arms 43 and 44. Note that, the weight detector 32 is provided to each of the balance arms 43 and 44.

Further, as illustrated in FIG. 2, the linear actuators 22 and 24, the heating furnace heater 3b, the weight detector 32, and the heaters 52a and 52b are controlled by a control part 80 formed of, for example, a computer.

Specifically, the control part 80 controls the energization of the heating furnace heater 3b to heat the furnace tube 9 (sample holders 41 and 42) in a predetermined heating pattern, and acquires temperature changes and weight changes of the samples $S_1$ and $S_2$ at this time from the weight detector 32.

Further, the control part 80 is configured to control energization of the heaters 52a and 52b, and maintain the weight detector 32 at a constant temperature.

Further, the control part 80 controls the operations of the linear actuators 22 and 24 to move the heating furnace 3 and the furnace tube 9 to a measurement position, a sample setting position, and a sample observation position described later.

The control part 80 corresponds to the "heater control part" in the claims.

Note that, the "measurement position" refers to such a position that the flange part 36 and the flange part 7 are hermetically connected to each other and the heating furnace 3 covers the sample holders 41 and 42 (that is, samples $S_1$ and $S_2$) of the furnace tube 9.

Figure 3:
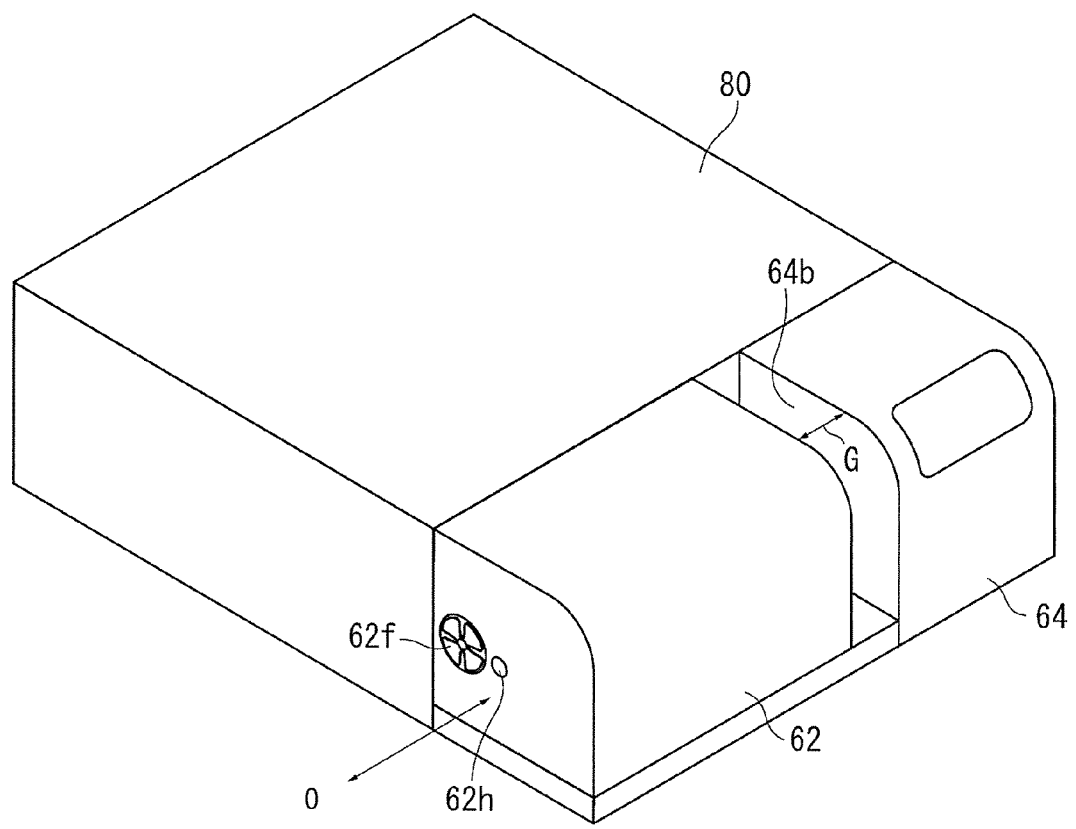
FIG. 3 is a perspective view for illustrating a heating furnace cover and a weight detector cover when viewed from a tip end side of the thermal analysis apparatus.

As illustrated in FIG. 3, the heating furnace cover 62 has a rectangular shape with a rounded upper corner, which is parallel to the axial direction O, has an exhaust hole 62h in a tip end surface thereof to overlap the tip end portion 9a of the furnace tube, and includes a fan 62f adjacent to the exhaust hole 62h, the fan 62f being configured to send air.

Figure 4:
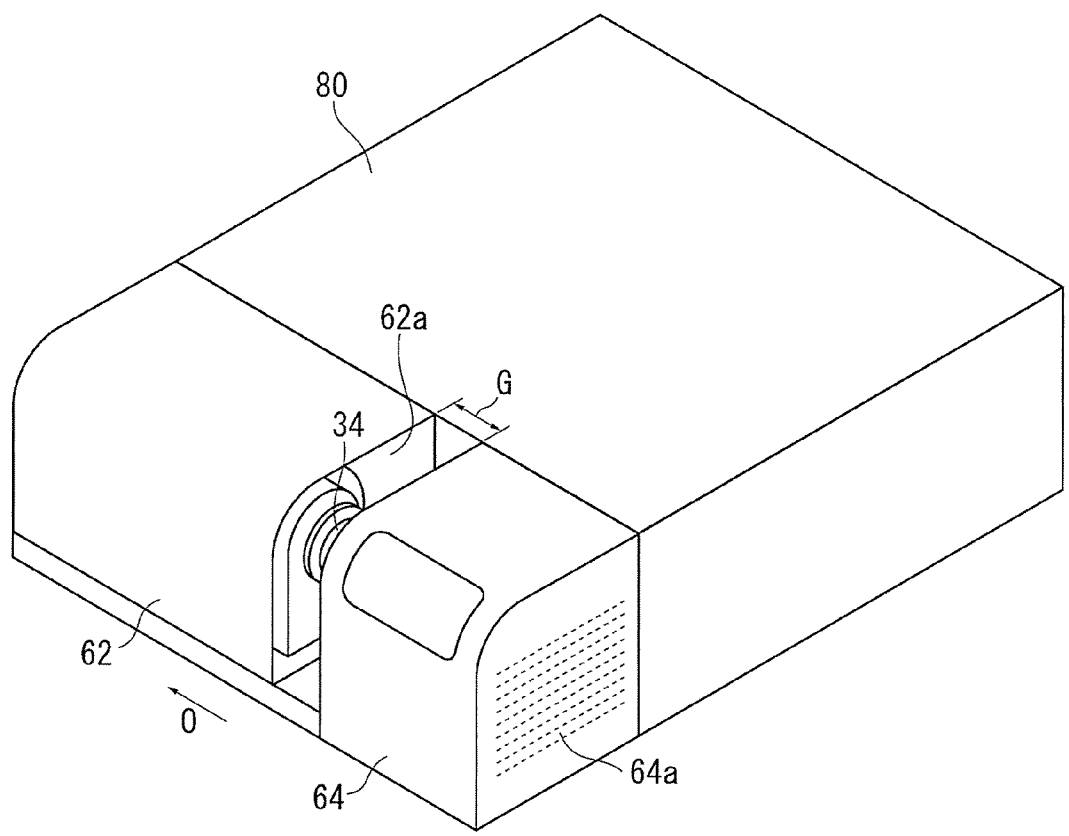
FIG. 4 is a perspective view for illustrating the heating furnace cover and the weight detector cover when viewed from a rear end side of the thermal analysis apparatus.

Further, as illustrated in FIG. 4, a rear end surface of the heating furnace cover 62 is open to form an air intake port 62a.

As illustrated in FIG. 2, the heating furnace cover 62 extends so as to cover at least the heating furnace 3 in the axial direction O. Then, a lower end side of the heating furnace cover 62 is mounted on the second support base 14, the second support base 14 or the first support base 12 reciprocates in the axial direction O, and the heating furnace cover 62 also reciprocates in the axial direction O with respect to the weight detector cover 64 (see FIG. 3).

Meanwhile, the weight detector cover 64 also has a rectangular shape with a rounded upper corner, which is parallel to the axial direction O, and is arranged on the rear end side of the heating furnace cover 62 via a gap G in the axial direction O. The weight detector cover 64 is directly mounted to the base 10.

Further, as illustrated in FIG. 4, a rear end surface of the weight detector cover 64 forms a louver-like opening 64a.

As illustrated in FIG. 2, the weight detector cover 64 is configured to cover at least the weight detector 32 in the axial direction O, and a tip end surface 64b thereof closes an external space on the tip end side of the weight detector 32 (space between an inner surface of the weight detector cover 64 and an outer surface of the heat insulating member 50).

Then, at least a part of the bellows 34 is exposed in the gap G between the heating furnace cover 62 and the weight detector cover 64. Further, on the base 10 overlapping the gap G, a second fan 10f configured to send air is provided. A part of the base 10 in which the second fan 10f is mounted is penetrated vertically so that the second fan 10f can take in air from below the base 10.

As illustrated in FIG. 3, the computer including the control part 80 is arranged in contact with the heating furnace cover 62 and the weight detector cover 64.

Figure 5:
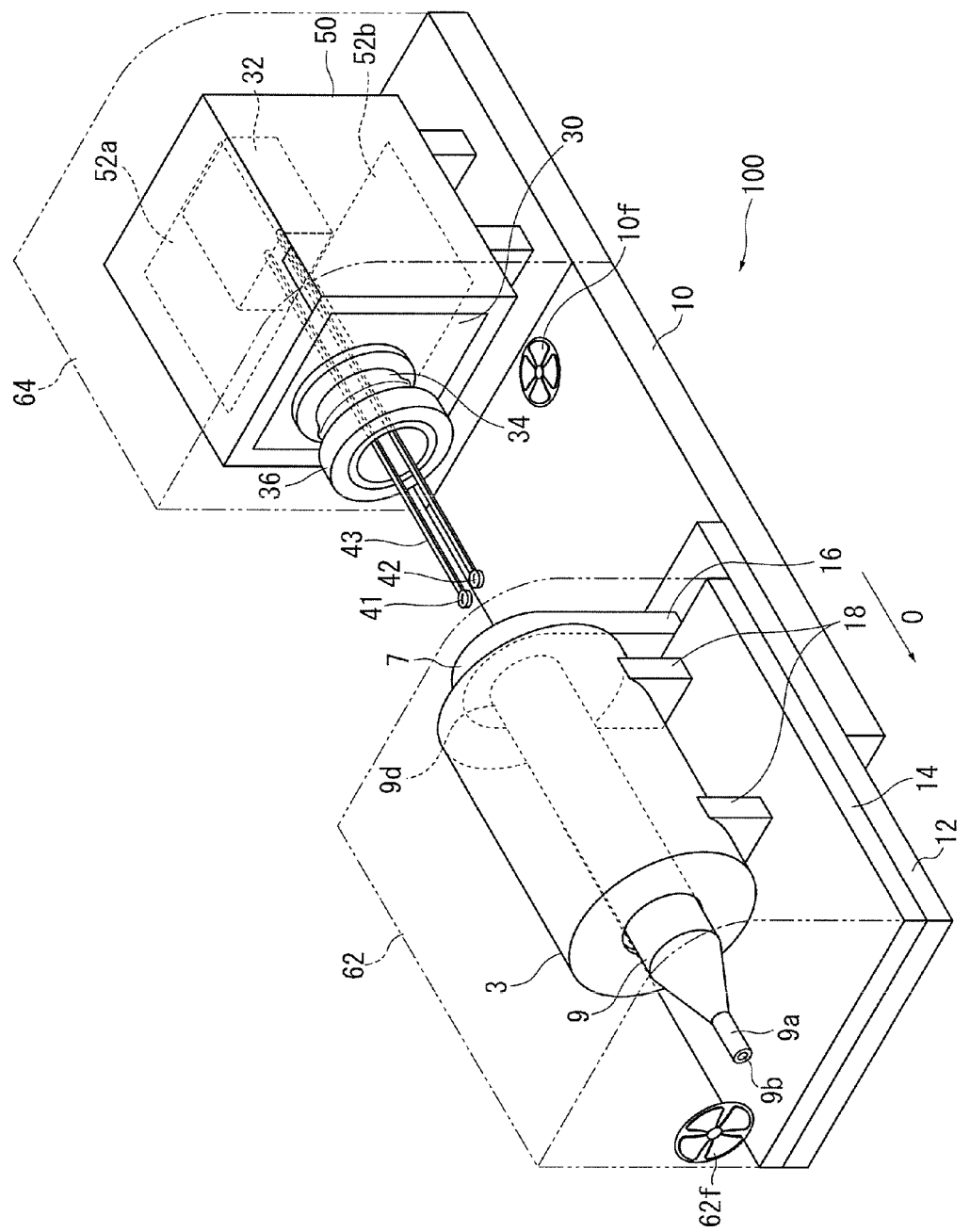
FIG. 5 is a view for illustrating positions of a heating furnace and a furnace tube at a sample setting position.

FIG. 5 illustrates positions of the heating furnace 3 and the furnace tube 9 in a case of setting the samples $S_1$ and $S_2$ onto the sample holders 41 and 42 or replacing the samples $S_1$ and $S_2$. When setting (placing) or replacing the samples $S_1$ and $S_2$, the second support base 14 is not moved but maintained at the measurement position (see FIG. 1 and FIG. 2), and only the first support base 12 is advanced by the linear actuator 22 toward the tip end side of the furnace tube 9 (left side of FIG. 5). Then, the first support base 12, the second support base 14, and the heating furnace cover 62 move integrally with each other. Accordingly, when the furnace tube 9 and the heating furnace 3, which are fixed to the first support base 12 and the second support base 14, respectively, are advanced toward the tip end side with respect to the above-mentioned measurement position, the sample holders 41 and 42 are exposed on the rear end side with respect to the furnace tube 9 and the heating furnace 3 so that the samples $S_1$ and $S_2$ can be set or replaced.

The position state of FIG. 5 is referred to as a "sample setting position".

Figure 6:
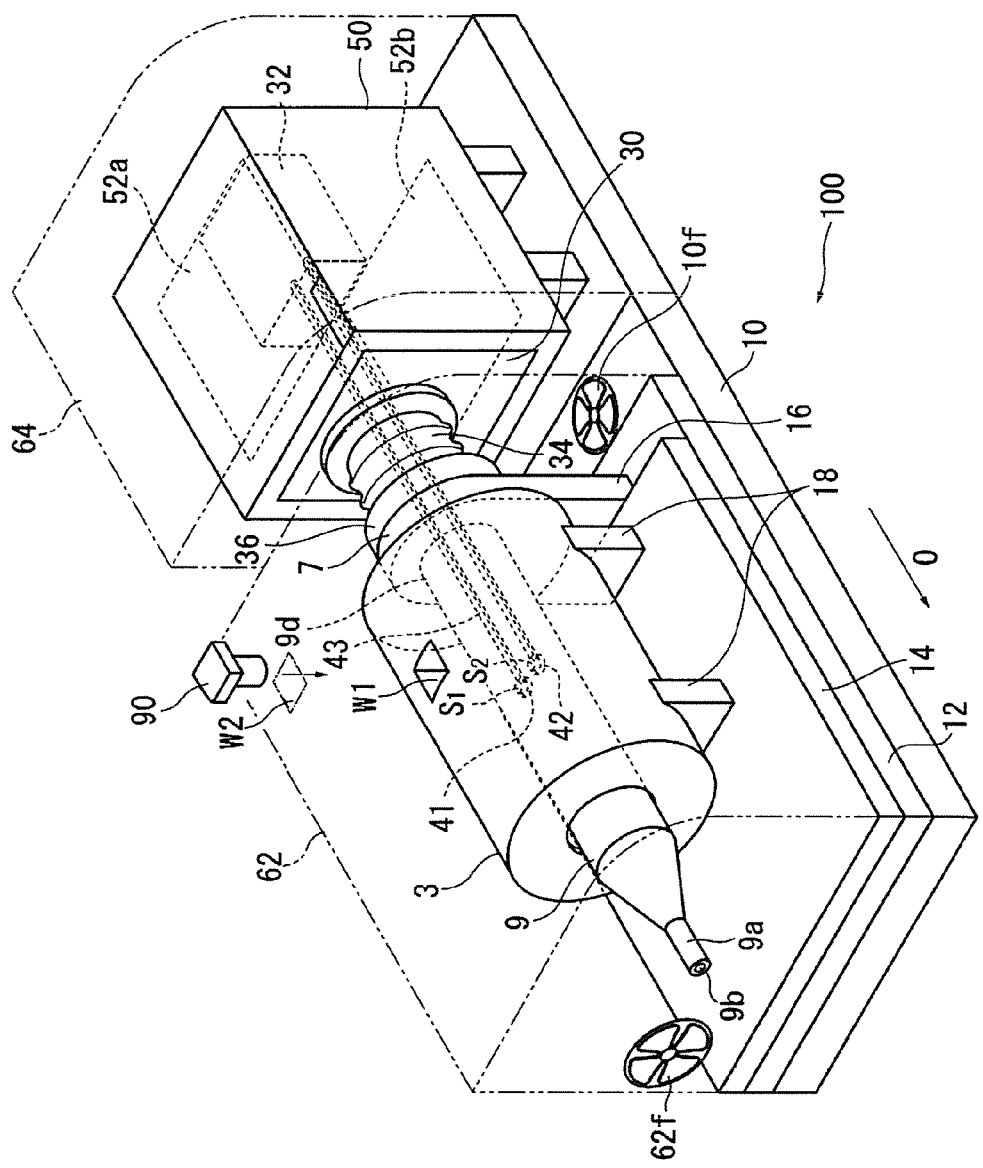
FIG. 6 is a view for illustrating an example of a method of observing samples in the furnace tube.

Further, as illustrated in FIG. 6, in a top surface of the heating furnace 3, a first opening portion W1 is formed to penetrate from the outer cylinder 3a toward a core tube 3c. In a top surface of the heating furnace cover 62, a second opening portion W2 is formed to overlap the first opening portion W1 when viewed from above (in a penetration direction of the first opening portion W1). Through the first opening portion W1 and the second opening portion W2, the furnace tube 9 is exposed at a position outside the sample holders 41 and 42 (that is, samples S1 and S2). As a result, changes of the samples S1 and S2 under thermal analysis can be observed through the furnace tube 9.

Specifically, after the samples S1 and S2 are heated by the heating furnace 3 at the measurement position illustrated in FIG. 1, the samples S1 and S2 under the thermal analysis, which are placed in the furnace tube 9, can be observed. In other words, imaging means (for example, camera or optical microscope) 90 can be arranged above the furnace tube 9 that is exposed immediately below the first opening portion W1 of the heating furnace cover 62 on the outer side of the heating furnace 3 to observe the samples S1 and S2 under the thermal analysis.

Next, features of the thermal analysis apparatus 100 according to the embodiment of the present invention are described. In the embodiment, the heaters 52a and 52b are of a resistance heating type.

First, with the heaters 52a and 52b being energized to be heated (above an ambient temperature) to the constant temperature, the weight detector 32 can be maintained at the constant temperature, and measurement accuracy can be increased.

Further, with the heaters 52a and 52b being set so that the energization current is 6 A or less, the heaters 52a and 52b can be heated with a relatively low current, and a magnetic field caused by the electric current flowing through a circuit of the heaters 52a and 52b is reduced. As a result, the magnetic field can be prevented from becoming noise upon measuring an electric current caused to flow through the coil 32a so that the balance arms 43 and 44 assume a horizontal state, and the measurement accuracy can be further increased.

Irrespective of DC or AC, an electric current for energizing the heaters 52a and 52b is preferably 6 A or less, and more preferably 5 A or less. As the energization current becomes smaller, a magnetic field generated by the electric current also becomes smaller. In the case of the resistance heating, an AC power source is preferred in view of a relationship between a target temperature range and a capacitance. Further, as the alternating current, for example, 50 Hz or more is exemplified.

A capacity (W) of a heater is obtained by multiplying a voltage (V) by an electric current (A). Therefore, in order to reduce a current value with the same heater capacity, an alternating current, which increases the voltage, is preferred.

The control part 80 is configured to control energization of the heaters 52a and 52b to maintain the weight detector 32 preferably at 50° C. or less, and more preferably 40° C. or less. Depending on a measurement sample, measurement from a room temperature is required in some cases, and hence ideally, control can be performed near the room temperature. This is because, when a heating maintaining temperature of the weight detector 32 by the heaters 52a and 52b is 50° C. or less, gravimetry near the room temperature can also be performed.

Incidentally, it has been found that, in a case where the magnetic field from the heaters 52a and 52b is reduced as described above, even when the balance arms 43 and 44 themselves have small magnetism, the magnetism affects measurement accuracy of the weight detector 32.

Generally, the balance arms 43 and 44 are formed with the use of a non-magnetic material (for example, stainless steel), but actual balance arms 43 and 44 may have small magnetism due to a change in crystal structure caused by an effect of cutting and other such processing, and other such reasons. To address this problem, when the balance arms 43 and 44 are ensured to have a specific TG signal noise width of 0.2 μg or less, noise caused by the balance arms 43 and 44 themselves can be suppressed, and the measurement accuracy of the weight detector 32 can be further increased.

Figure 8:
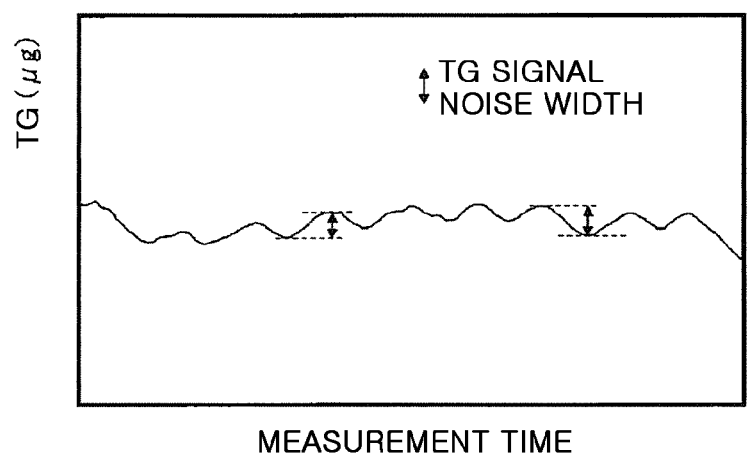
FIG. 8 is a graph for showing a method of measuring the TG signal noise width of the balance arms (levers).

As illustrated in FIG. 8, the specific TG signal noise width refers to a background fluctuation width of a TG curve acquired when the sample holders 41 and 42 are placed in an empty state on the balance arms 43 and 44, respectively, and are measured in a measurement mode of the thermal analysis apparatus 100. Specifically, the specific TG signal noise width is a difference between one peak top and a peak bottom before and after the peak top. Therefore, it means that, as the noise width becomes smaller, background becomes more stable and accuracy becomes higher.

A measurement temperature is the room temperature, a temperature of the weight detector 32 is set to 35° C., measurement time is set to 4 minutes, and of the number of background fluctuation widths acquired in the 4 minutes, an average of 10 consecutive background fluctuation widths in the middle in time is taken. For example, when 15 background fluctuation widths are acquired in 4 minutes, the 1st and 2nd, or 1st to 3rd data items in time are discarded, and an average of the 3rd to 12th, or 4th to 13th data items is taken.

Examples of a method of managing the noise width of the balance arms 43 and 44 to 0.2 µg or less include demagnetizing the balance arms 43 and 44 by an AC demagnetization method.

Further, as illustrated in FIG. 2, in this embodiment, the fan 62*f* is provided to the heating furnace cover 62 to take in outside air from the air intake port 62*a* and generate an airflow F2 inside the heating furnace cover 62 to travel from the rear end to the tip end in the axial direction O.

With this configuration, heat of the heating furnace 3 can be prevented from being conducted to the weight detector 32 side, and the weight detector 32 can be maintained at the constant temperature more reliably to increase the measurement accuracy. Further, the weight detector 32 can be maintained at a lower temperature, and hence it becomes easier to maintain the weight detector 32 at 50° C. or less.

Further, as illustrated in FIG. 2, in this embodiment, the tip end surface 64*b* of the weight detector cover 64 closes the external space on the tip end side of the weight detector 32, and has an opening 64*a* on the rear end side of the weight detector 32.

With this configuration, the tip end surface 64*b* can prevent heat of the heating furnace 3 from being conducted to the weight detector 32 side, and outside air F3 can be allowed to enter and exit into and from surroundings of the weight detector 32 through the opening 64*a*. As a result, a difference between the heating temperature of the heaters 52*a* and 52*b* and the ambient temperature of the weight detector 32 can be increased, and the weight detector 32 can be maintained at the constant temperature more reliably by the heaters 52*a* and 52*b*. Further, the weight detector 32 can be maintained at a lower temperature, and hence it becomes easier to maintain the weight detector 32 at 50° C. or less.

Further, as illustrated in FIG. 2, in this embodiment, with at least a part of the bellows 34 being exposed in the gap G between the heating furnace cover 62 and the weight detector cover 64, it is easy to cool the bellows 34, and the heat of the heating furnace 3 can be prevented from being conducted to the weight detector 32 side via the bellows 34.

As a result, the weight detector 32 can be maintained at the constant temperature more reliably to increase the measurement accuracy. Further, the weight detector 32 can be maintained at a lower temperature, and hence it becomes easier to maintain the weight detector 32 at 50° C. or less.

In particular, when the second fan 10*f* configured to generate an airflow F1 from the gap G to the bellows 34 is provided, the bellows 34 can be further cooled.

Figure 7:
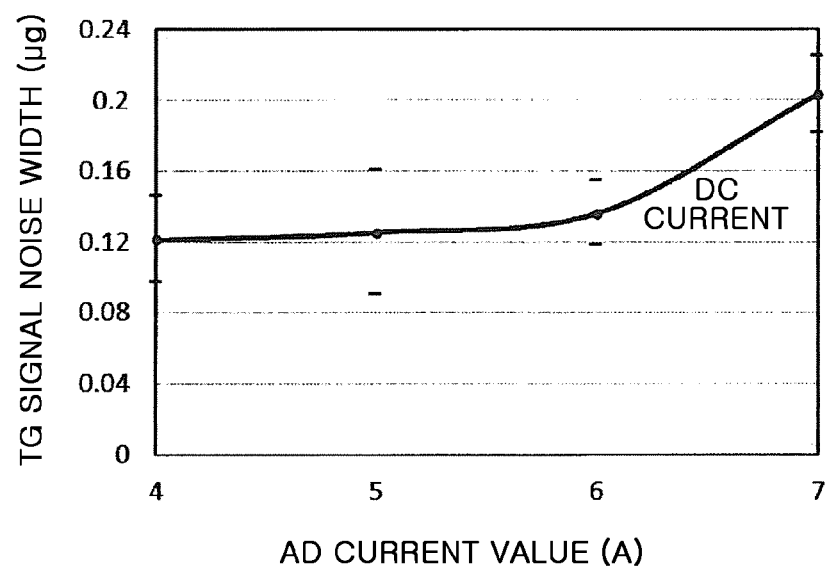
FIG. 7 is a graph for showing a TG signal noise width of balance arms (levers) obtained when a DC current for energizing heaters is changed from 4 A to 7 A.

In FIG. 7, the TG signal noise width of the balance arms 43 and 44 obtained when a DC current for energizing the heaters 52*a* and 52*b* was changed from 4 A to 7 A in units of 1 A is shown. The voltage applied to the heaters was set to a voltage required to perform control so that the temperature in the measurement chamber becomes 35° C. through heating by the heaters. A value of the TG signal noise width is an average value of 10 signal noise widths for each current value. Error bars indicate standard variances at that time.

The TG signal noise width suppressed to about 0.15 µg through demagnetization of the balance arms 43 and 44 in advance was used. It should be noted, however, that the TG signal noise exceeded 0.2 µg at 7 A, and a further increase in noise width was expected with an electric current of more than 7 A. Further, with an electric current exceeding 7 A, it is considered that members other than the balance arms, for example, balance coils and the like were affected by an external magnetic field.

As apparent from FIG. 7, when a DC current value was from 4 A to 6 A, the TG signal noise width was between 0.12 µg and 0.14 µg, and was not increased from the TG signal noise width (0.15 µg) demagnetized in advance before the measurement. In other words, it can be seen that a noise magnetic field was hardly generated by the heater current. In contrast, at the DC current value of 7 A, the TG signal noise width was abruptly increased to 0.2 µg, which exceeded the TG signal noise width (0.15 µg) demagnetized in advance before the measurement, and it was suggested that the increase was caused by the noise magnetic field generated by the heater current.

In the case of the AC current, in view of generally-used single-phase 100-V or three-phase 200-V power sources, an AC current value required to obtain the same heater efficiency as in the case of the DC current is about 1/10th of the DC current, and hence an intensity of the generated magnetic field is accordingly small. Therefore, for the TG signal noise width, the use of the AC power source is preferred as compared to the case of using the DC current.

The present invention is not limited to the embodiment described above, and encompasses various modifications and equivalents within the spirit and scope of the present invention.

In the above-mentioned embodiment, the furnace tube is inserted into the heating furnace, and the sample holding portions are arranged inside the furnace tube. However, the sample holding portions may be directly arranged inside the heating furnace.

Further, the second fan 10*f* is arranged at the bottom of the gap G in the case of FIG. 2, but may be arranged in a side wall portion or a top wall portion.

The number of installed heaters and installation positions thereof are not limited to the above-mentioned example.

What is claimed is:

1. A thermal analysis apparatus, comprising:
   a cylindrical heating furnace extending in an axial direction;
   a weight detector, which is arranged on a rear end side in the axial direction of the cylindrical heating furnace, and includes a lever extending in the axial direction to detect a weight;
   a connecting portion configured to connect the cylindrical heating furnace and the weight detector such that an internal space of the cylindrical heating furnace is in communication with an internal space of the weight detector through the connecting portion, the connecting portion configured to allow the lever to pass through and extend into the internal space of the cylindrical heating furnace from the weight detector;
   a sample holding portion, which is connected to a tip end of the lever and arranged inside the cylindrical heating furnace, and is configured to hold a sample;
   a resistance heater, which is arranged to cover the weight detector, and is to be energized by an electric current of 6 A or less;
   a heater control part configured to control an energization state of the resistance heater to maintain the weight detector at a constant temperature; and
   a heating furnace cover, which is configured to cover at least the cylindrical heating furnace in the axial direction and has an air intake port on the rear end side of the cylindrical heating furnace, the heating furnace cover including a fan arranged in front of the air intake port, which is configured to generate an airflow inside the heating furnace cover to travel from a rear end to a tip end in the axial direction.

2. The thermal analysis apparatus according to claim 1, wherein the heater control part is configured to maintain the weight detector at 50° C. or less.

3. The thermal analysis apparatus according to claim 1, wherein the lever has a TG signal noise width, which indicates a background fluctuation width of a TG curve measured with the thermal analysis apparatus, of 0.2 µg or less.

4. The thermal analysis apparatus according to claim 1, further comprising a weight detector cover, which is configured to cover at least the weight detector in the axial direction and close an external space on a tip end side of the weight detector, and has an opening into and from which air enters and exits on the rear end side of the weight detector.

5. The thermal analysis apparatus according to claim 1, further comprising a weight detector cover, which is configured to cover at least the weight detector in the axial direction and close an external space on a tip end side of the weight detector, and has an opening into and from which air enters and exits on the rear end side of the weight detector.

6. The thermal analysis apparatus according to claim 5, wherein the thermal analysis apparatus has a gap between the heating furnace cover and the weight detector cover in the axial direction, and wherein at least a part of the connecting portion is exposed in the gap.

7. The thermal analysis apparatus according to claim 6, further comprising a second fan, which is arranged in a particular position, and is configured to generate an airflow from the gap to the connecting portion.

8. The thermal analysis apparatus according to claim 1, wherein the cylindrical heating furnace includes: a furnace tube, which is made of a transparent material and is formed into a cylindrical shape, and in which the sample holding portion is arranged; a cylindrical core tube, which forms an inner surface of the cylindrical heating furnace, and into which the furnace tube is inserted; a heating furnace heater fitted onto the cylindrical core tube; and a cylindrical outer cylinder, which has side walls on both ends thereof, and surrounds the heating furnace heater, and wherein the cylindrical core tube and the cylindrical outer cylinder have first opening portions, which are formed as through holes that connect to each other so that the sample is observable from outside the cylindrical outer cylinder through the furnace tube.

9. The thermal analysis apparatus according to claim 1, wherein the cylindrical heating furnace includes: a furnace tube, which is made of a transparent material and is formed into a cylindrical shape, and in which the sample holding portion is arranged; a cylindrical core tube, which forms an inner surface of the cylindrical heating furnace, and into which the furnace tube is inserted; a heating furnace heater fitted onto the cylindrical core tube; and a cylindrical outer cylinder, which has side walls on both ends thereof, and surrounds the heating furnace heater, and wherein the cylindrical core tube and the cylindrical outer cylinder have first opening portions, which are formed as through holes that connect to each other so that the sample is observable from outside the cylindrical outer cylinder through the furnace tube.

10. The thermal analysis apparatus according to claim 9, wherein the heating furnace cover has a second opening portion, which overlaps the first opening portions in a penetration direction.

* * * * *